United States Patent [19]

Van Laar

[11] Patent Number: 4,842,056
[45] Date of Patent: Jun. 27, 1989

[54] PROCESS FOR METAL PLATING CEMENT IN A PERFORATED WELL

[75] Inventor: Hermanus G. Van Laar, Calgary, Canada

[73] Assignee: Shell Oil Company, Houston, Tex.

[21] Appl. No.: 135,213

[22] Filed: Dec. 21, 1987

[30] Foreign Application Priority Data

Dec. 22, 1986 [CA] Canada .................. 525984

[51] Int. Cl.⁴ ............. E21B 33/13; E21B 41/02
[52] U.S. Cl. ................... 166/292; 166/300; 166/902
[58] Field of Search ........... 166/248, 297, 298, 281, 166/292, 300, 902; 427/304, 305

[56] References Cited

U.S. PATENT DOCUMENTS

| 3,123,138 | 3/1964 | Robichaux . | |
| 3,172,471 | 3/1965 | Warren . | |
| 3,339,633 | 9/1967 | Richardson . | |
| 3,393,737 | 7/1968 | Richardson . | |
| 3,437,143 | 4/1969 | Cook | 166/285 |
| 3,438,440 | 4/1969 | Richardson | 166/292 |
| 3,438,441 | 4/1969 | Richardson | 166/292 |
| 3,455,388 | 7/1969 | Huitt | 166/292 |
| 3,552,493 | 1/1971 | Bezemer | 166/295 |
| 3,599,718 | 8/1971 | Richardson et al. | 166/292 |
| 3,685,582 | 8/1972 | Richardson | 166/292 |
| 3,701,383 | 10/1972 | Richardson et al. | 166/281 X |
| 3,709,298 | 1/1973 | Pramann | 166/276 |
| 3,709,299 | 1/1973 | Suman, Jr. et al. | 166/292 X |
| 3,743,020 | 7/1973 | Suman, Jr. et al. | 166/281 X |
| 3,747,678 | 7/1973 | Waid | 166/295 |
| 3,820,604 | 6/1974 | Karnes | 166/297 |
| 4,189,002 | 2/1980 | Matin | 166/295 |

OTHER PUBLICATIONS

"Effects of Supercritical Carbon Dioxide on Well Cements," D. D. Onan, pesented at 1984, Permian Basin Oil & Gas Recovery Conference, Midland, Texas, Mar. 8-9, 1984, Society of Petroleum Engineers, Publication No. 12593.

"Dowell Schlumberger Says New Cement Resists $CO_2$ Corrosion," *Enhanced Recovery Week*, Jun. 23, 1986, pp. 3–4.

*Primary Examiner*—George A. Suchfield

[57] ABSTRACT

A process for metal plating the perforation tunnels in the cement sheath between casing and wellbore in a subterranean well to protect the cement from $CO_2$ attack.

8 Claims, No Drawings

PROCESS FOR METAL PLATING CEMENT IN A PERFORATED WELL

RELEVANT APPLICATION

Application Serial No. 065,171, filed June 16, 1987, now U.S. Pat. No. 4,718,492, by the same inventor, which is a continuation of application Serial No. 827,922, filed Feb. 10, 1986, now abandoned, by the same inventor, is relevant to this application.

BACKGROUND OF THE INVENTION

The invention relates to a process for passing carbon dioxide through a cased, cemented and perforated well. Carbon dioxide in the presence of moisture leads to carbonic acid attack of oil well cement. This attack, if allowed to proceed unchecked eventually weakens the cement to an unacceptable condition. The major constituent of set cement, hydrated calcium silicate, breaks down by the action of $CO_2$ as follows:

$$3CaO.2SiO_2.3H_2O + 3CO_2 \rightarrow 3CaCO_3 + 2SiO_2 + 3H_2O.$$

The reaction products calcium carbonate and silica possess less binding power than hydrated calcium silicate. Therefore, a considerable deterioration in cement strength takes place by $CO_2$ attack.

Cement is exposed to $CO_2$ in wells for injection of $CO_2$ and in those used for the production of reservoir fluid which, at a certain stage of a $CO_2$-flooding project, contains $CO_2$ as well. Also in source wells, used for the supply of $CO_2$, there is exposed cement.

The only place of exposure of $CO_2$ in injection, production and source wells is at the perforations, where the perforation tunnels traverse the cement sheath between casing and borehole. To maintain the integrity of injection, production, and source wells, the exposed cement should be shielded from $CO_2$ attack. This can be achieved by providing the exposed cement with an impermeable layer of inert material which protects the cement. It has now been found that nickel is very suitable for this purpose.

Electroless metal plating has been used for consoliation of loose or incompetent subsurface formations. U.S. Pat. No. 3,393,737 describes an electroless metal plating technique for consolidating loose formations, and discloses that this technique is superior to resin consolidation techniques. U.S. Pat. No. 3,685,582 describes an electroless metal plating technique for consolidating loose formations which can be advantageously used in high temperature formations (250° to 400° F.).

SUMMARY OF THE INVENTION

The invention concerns a process for electroless metal plating of perforation tunnels in the cement sheath between casing and borehole in a subterranean well. The metal plating process advantageously utilizes a preflush to prepare the surface, an activator to initiate the plating reaction, a spacer, and the plating solution, followed by a final spacer. The metal plating serves to protect the cement from $CO_2$ attack, when $CO_2$ is injected into the formation, or produced from it.

DETAILED DESCRIPTION OF THE INVENTION

The protective layer of nickel is suitably installed as described hereinafter. After cementing the casing string in a $CO_2$ production or injection well, the casing is perforated, suitably in brine, and the perforations are advantageously washed clean. The nickel plating technique is then carried out, preferably using the following steps:

1. If the perforated interval is less than 3 m long, a retrievable packer with a tail pipe is preferably run on tubing and suspended, preferably 0.5–1.5 m above the highest perforation. In the perforated interval is longer than 3 m, a retrievable straddle packer is preferably placed across the lowest 3 m of the interval. As an alternative, a through-tubing expandable/collapsible straddle packer can be run on coiled tubing as a selective placement tool. The bottom end of the tail pipe should reach to below the lowest perforations with the packer in the set position.

2. The packer is set and the formation injectivity tested with a temperature recording device opposite the perforations. Based on this information, the appropriate spacer solution is selected.

3. The packer is released and the preflushes, activator solution, and enough spacers are injected to fill the tubing and the annulus covering the perforations.

4. The packer is reset and the remainder of the spacers injected, followed by the plating solution and the final spacer.

5. The tubing and two pore volumes are displaced with brine.

6. The packer is released and pulled.

7. Where the interval is longer than 3 m, the straddle packer is repositioned to a maximum of 3 m above the previous treatment position and steps 2. through 6. are repeated.

8. Step 7. is repeated as many times as required to treat the whole interval.

The preflushes serve to remove oil from the formation, and they preferably contain a slug of diesel oil followed by the same volume of isopropyl alcohol.

The activator solution preferably contains colloidal palladium. The preferred chemical composition is shown in Table 1.

TABLE 1

| Preferred Chemical Composition of Buffered Activator Solution | |
|---|---|
| Component | Quantity per m³ of Solution |
| Water | 968.97 liter |
| Gum Arabic | 0.13 kilogram |
| Hydrazine Hydrate (85%) | 1.61 liter |
| Palladium Chloride Solution | 4.00 liter |
| Formic Acid (90%) | 4.03 liter |
| Sodium Formate | 19.97 kilogram |

Remarks
(i) Chemicals are added to the water in the order listed with complete mixing and dissolving before adding the next chemical.
(ii) One liter of $PdCl_2$ solution contains: 16 g $PdCl_2$, 100 ml HCl (38%), and 900 ml water.
(iii) This solution contains 64 grams $PdCl_2$ per m³ of activator.

The spacer contains a dilute palladium solution, followed by a plating nickel solution.

The plating solution preferably contains a nickel salt and a reducing agent. One plating solution is used for low temperature application (15°–50° C.), and one for intermediate temperature application (40°–85° C.). The preferred chemical compositions are presented in Tables 2 and 3, respectively.

TABLE 2

Preferred Chemical Composition of Plating Solution For Use at Low Temperatures

| Component | Quantity per m$^3$ of Solution |
| --- | --- |
| Water | 854.6 liter |
| $NiCl_2.6H_2O$ | 37.88 kilogram |
| $NaH_2PO_2.H_2O$ | 45.49 kilogram |
| $NH_4Cl$ | 62.46 kilogram |
| 30% ammonia solution | 52.13 liter |
| Na-Saccharide $2H_2O$ | 0–13 kilogram |

Remarks
(i) Quantity of Na-Saccharide $2H_2O$ depends on injection rate and temperature.

TABLE 3

Preferred Chemical Composition of Plating Solution For Use At High Temperatures

| Component | Quantity per m$^3$ of Solution |
| --- | --- |
| $NiSO_4.6H_2O$ | 84.14 kilogram |
| $NaH_2PO_2.H_2O$ | 120.36 kilogram |
| Succinic Acid | 13.12 kilogram |
| NaOH (30% solution) | 22.31 liter |
| Sodium Formate | 44.98 kilogram |
| Formic Acid (90%) | 25 to 175 liter |
| Water | 866.98–(25 to 175) liter |

Remarks
(i) Range of Formic Acid depends on injection rate, temperature, and specific surface of medium treated.
(ii) Quantity of water added is 866.98 liters less the amount of formic acid added.

The final spacer advantageously is an ammoniacal buffer solution.

The following fluid volumes (this includes the perforation volumes) are preferably applied:

| | |
| --- | --- |
| Preflush (i) | 4 to 6 pore volumes |
| Preflush (ii) | 4 to 6 pore volumes |
| Activator solution | 45 to 55 pore volumes |
| Spacer (i) | 4 to 6 pore volumes |
| Spacer (ii) | 4 to 6 pore volumes |
| Plating solution | 90 to 110 pore volumes |
| Final spacer | 4 to 6 pore volumes |

The nickel plating technique is dynamic, i.e., precipitation of nickel takes place while the plating solution passes through the perforations. The amount of nickel plated out per cm$^2$ of cement depends on the fluid flow rate through the perforations and the prevailing bottom hole temperature. The protective layer applied on the walls of the perforation tunnels should be strong enough to resist the high shear rates normally occurring in well perforations, yet thin enough to prevent injectivity or productivity impairment.

The invention will now be further elucidated by the following example to which it is by no means restricted.

EXAMPLE

A $CO_2$ injection well is completed with 9-⅝-inch casing (59.41 kg/m) in 12-¼-inch hole through sandstone with an average permeability and porosity of 1200 mD and 15%, respectively, at 2250 m. The casing is perforated in brine (density 1100 kg/m$^3$) from 2246 to 2249 m with ½-inch holes, 13 per m, total 39 holes. The perforations are internally coated as follows:

A retrievable 9-⅝-inch packer with a 4.5 m 2-⅜-inch tail pipe (7.0 kg/m) is run on 2-⅜-inch tubing (7.0 kg/m) to 2245 m.

The packer is set at 2245 m, an injectivity test conducted and the bottom hole temperature measured. An injectivity rate of 0.5 m$^3$/min is possible, and the dynamic bottom hole temperature is 70° C. A plating fluid with the composition shown in Table 3 is selected.

The packer is released and the following fluid pumped down the hole: 310 l liters of preflush 1, followed by 400 liters of preflush 2, and then by 400 liters of activator solution.

The packer is reset at 2245 m and pumping continued at a rate of 0.5 m$^3$/min as follows: 400 liters of spacer 1, followed by 400 liters of spacer 2, then by 8000 liters of plating solution, and finally by 400 liters of final spacer. The fluids are chased by 4900 liters of brine. The packer is then released and pulled out of the hole.

In this treatment, the perforations are exposed to 8000 liters of plating solution, containing 150 kg nickel. Assuming that ¼% of the available nickel precipitates on the perforation tunnel walls, then an 840 μm protective layer is formed.

What is claimed is:

1. A process for metal plating cement perforations in a subterranean well comprising:
   injecting into the cement perforations a plurality of pore volumes of an aqueous solution containing an activating agent, such that the surface of the cement perforations is activated;
   injecting into the cement perforations a first spacer;
   injecting into the cement perforations a plurality of pore volumes of an aqueous solution containing a metal plating compound and a reducing agent, such that the surface of the cement perforations is metal plated; and
   injecting into the cement perforations a second spacer.

2. The process of claim 1 in which, prior to injecting the activating and metal plating solutions, preflush solutions, capable of removing debris from the perforations, are injected into the cement perforations.

3. The process as claimed in claim 2, in which the preflush solutions consist of diesel oil followed by isopropyl alcohol.

4. The process as claimed in claim 2, in which the activator solution contains colloidal palladium.

5. The process as claimed in claim 2 in which the first spacer consists of a dilute palladium solution followed by a nickel plating solution.

6. The process as claimed in claim 2 in which the plating compound contains a nickel salt.

7. The process as claimed in claim 2 in which the second spacer is an ammoniacal buffer solution.

8. A proces for metal plating cement perforations in a subterranean well comprising:
   injecting into the cement perforations preflush solutions of diesel oil followed by isopropyl alcohol, capable of removing debris from the perforations;
   injecting into the cement perforations an aqueous solution containing colloidal palladium, capable of activating the surface of the cement perforations;
   injecting enough of said colloidal palladium solution to flow a plurality of pore volumes of the solution through the cement perforations, such that the surface of the cement perforations is activated;

injecting into the cement perforations a dilute palladium solution followed by a nickel plating solution, as a first spacer;

injecting into the cement perforations an aqueous nickel plating solution containing a nickel salt and a reducing agent;

injecting enough of said nickel plating solution to displace said spacer and flow a plurality of pore volumes of the nickel plating solution through the cement perforations, such that the surface of the cement perforations is nickel plated; and injecting into the cement perforations an ammoniacal buffer as a second spacer.

* * * * *